United States Patent [19]

Gente et al.

[11] Patent Number: 5,061,433
[45] Date of Patent: Oct. 29, 1991

[54] PROCESS FOR THE REPLACEMENT OF A HEATING ROD OF A PRESSURIZER OF A PRESSURIZED-WATER NUCLEAR REACTOR

[75] Inventors: Daniel Gente, Villeurbanne; Marcel Giron, Anse, both of France

[73] Assignee: Framatome, Courbevoie, France

[21] Appl. No.: 536,719

[22] Filed: Jun. 12, 1990

[30] Foreign Application Priority Data

Jun. 12, 1989 [FR] France ............................ 89 07725

[51] Int. Cl.⁵ ........................................... G21C 19/20
[52] U.S. Cl. ................................ 376/260; 376/307; 29/402.07; 29/906
[58] Field of Search ............................ 376/307, 260; 165/104.27, 104.32; 29/402.07, 402.08, 402.16, 890.031, 906; 219/60 A; 228/119

[56] References Cited

U.S. PATENT DOCUMENTS

| 3,194,937 | 7/1965 | Brons et al. ...................... 219/60 A |
| 4,255,840 | 3/1981 | Loch et al. ........................ 29/402.07 |
| 4,319,961 | 3/1982 | Coussau et al. .................... 376/260 |
| 4,707,002 | 11/1987 | Boissier et al. .................... 376/203 |
| 4,804,813 | 2/1989 | Tesch ................................ 219/60 A |

FOREIGN PATENT DOCUMENTS

| 2060988 | 6/1972 | Fed. Rep. of Germany . |
| 2758192 | 6/1979 | Fed. Rep. of Germany ...... 376/307 |
| 2540575 | 4/1984 | France . |
| 86/00026 | 1/1986 | PCT Int'l Appl. . |
| 888946 | 2/1962 | United Kingdom . |

*Primary Examiner*—Daniel D. Wasil
*Attorney, Agent, or Firm*—Pollock, Vande Sande & Priddy

[57] ABSTRACT

To ensure the sealed fixing of a replacement heating rod (4) on a collar (3) for passing through the casing (1) of a pressurizer, a weld is made in a single pass by a regulated MIG process. A shaft is fixed on one end of the heating rod projecting in relation to the collar (3) and in the extension thereof. A welding device is engaged and fixed in position on the shaft, this welding device comprising a tubular support (14) and an inert-gas orbital welding torch (10) with an electrode made of fusible metal, rotatably mounted about the axis of the support (14) which coincides with the axis of the rod (4). The welding torch (10) and a device to unwind welding wire which is placed in a cabinet (6) are set into synchronous rotation during the welding, by appropriate drive means. The welding is carried out in a single pass on the entire periphery of the heating rod (4) and of the collar (3).

4 Claims, 4 Drawing Sheets

PROCESS FOR THE REPLACEMENT OF A HEATING ROD OF A PRESSURIZER OF A PRESSURIZED-WATER NUCLEAR REACTOR

FIELD OF THE INVENTION

The invention relates to a process and a device for the replacement of a heating rod of a pressurizer of a pressurized-water nuclear reactor.

Pressurized-water nuclear reactors comprise a primary circuit in which the cooling water of the reactor is maintained at a high pressure of the order of 155 bar, by virtue of a pressurizer disposed on one of the branches of the primary circuit.

The pressurizer permits the maintenance of the pressure in the primary circuit between certain specified limits, either by aspersion, when the pressure has a tendency to exceed the accepted upper limit, or by electrical heating of the primary fluid, when the pressure has a tendency to fall below the accepted lower limit. These operations are effected within the pressurizer which comprises, in particular, a casing having a domed base through which electrical heating rods are introduced into the pressurizer.

Passage collars are fixed by welding on the base of the pressurizer, each at the location of a passage opening. The heating rods are introduced into the collars and welded at their ends, in such a manner as to ensure mechanical retention and the sealing of the connection.

The heating rods are constructed in the form of glove fingers enclosing the heating resistors and comprising an open end at the location of the outer end of the passage collar, in order to ensure the connection and the supply of the electrical resistors.

Certain heating rods may become defective in service, so that it is necessary to check periodically their state of operation.

In the case where the presence of a defective rod has been detected, the replacement thereof is carried out in such a manner as to continue to ensure a satisfactory operation of the pressurizer.

In a general way, the replacement of a heating rod of a pressurizer is carried out by a sequence of successive operations comprising, in particular, sectioning of the collar, extraction of the defective rod, cleaning and machining of the cut-off end of the collar, positioning of a replacement rod, temporary fixing of this rod on the collar by welding points and final fixing of the rod by formation of a continuous circular weld ensuring the junction between the rod and the end of the collar. Various monitoring operations must be carried out between the operational phases set forth hereinabove.

The welding operations are carried out by the TIG process, the continuous welding band between the rod and the collar being constructed in a plurality of passes, by an automatic machine ensuring the fusion of a fusible metal wire.

Such an automatic TIG welding installation with fusible metal is extremely bulky and difficult to utilize to construct the junction, by welding, of tubular parts of small diameter, such as a heating rod and a passage collar of a pressurizer.

SUMMARY OF THE INVENTION

The object of the invention is therefore a process for the replacement of a heating rod of a pressurizer of a pressurized-water nuclear reactor, which rod is introduced and fixed by welding in a collar which is solid with the casing of the pressurizer, at the location of a passage opening of this casing, consisting in sectioning the collar above the connecting weld of the heating rod, extracting the heating rod, positioning a replacement heating rod, fixing this rod in a temporary manner on the collar, and constructing a continuous annular junction weld between the heating rod and the collar, it being possible for this process to be implemented in a simple and rapid manner, while avoiding, in particular, numerous monitoring operations.

In order to achieve this object, to construct the continuous weld between the rod and the collar, a tubular shaft is fixed on one end of the heating rod projecting in relation to the collar and in the extension thereof, there is engaged and fixed on the tubular shaft, in welding position, a welding device comprising a tubular support, an inert-gas orbital welding torch with an electrode made of fusible metal rotatably mounted about the axis of the support, coinciding with the axis of the heating rod, and equipped with a rotary drive means and a device to unwind welding wire rotatably mounted on a fixed base about the axis of the heating rod and equipped with drive means, and the welding torch and the unwinding device are set into rotation in a synchronous manner about the axis of the heating rod, in such a manner as to form the weld in a single pass, on the entire periphery of the heating rod and of the collar.

BRIEF DESCRIPTION OF THE DRAWINGS

In order to provide a good understanding of the invention, a description will now be given, with reference to the accompanying drawings, of an embodiment of a welding device permitting the implementation of the process for the replacement of a heating rod of a pressurizer according to the invention.

DESCRIPTION OF PREFERRED EMBODIMENT

Figure 1:
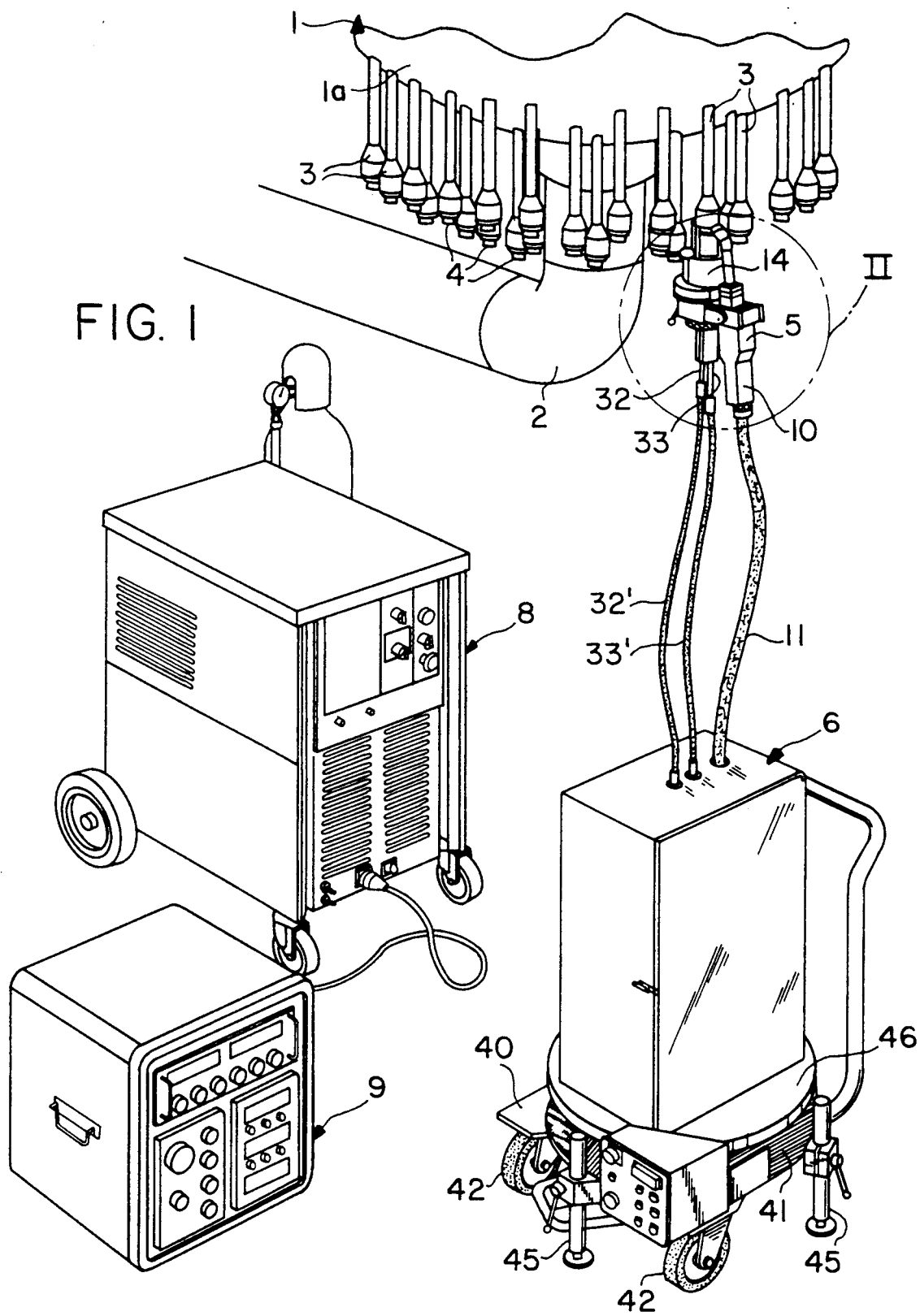
FIG. 1 is an overall perspective view of a welding device in service position for the welding of a heating rod of a pressurizer of a pressurized-water nuclear reactor.

FIG. 1 shows the domed base 1a of the casing 1 of a pressurizer of a pressurized-water nuclear reactor. The central part domed base 1a is traversed by a duct of large cross-section 2 permitting the connection of the pressurizer to the primary circuit of the reactor.

Collars 3 are welded to on the base of the pressurizer, each at the location of a passage opening of the base 1a, in such a manner as to ensure the passage of a heating rod 4 penetrating within the casing 1 of the pressurizer.

During the operation of the reactor, the heating rods 4 are supplied with electric current in such a manner as to maintain the pressure of the primary fluid above a specified minimum limiting value.

In FIG. 1, the pressurizer has been represented in the course of a maintenance and repair operation consisting in replacing a heating rod 4 fixed by welding on a passage collar 3.

Figure 2:
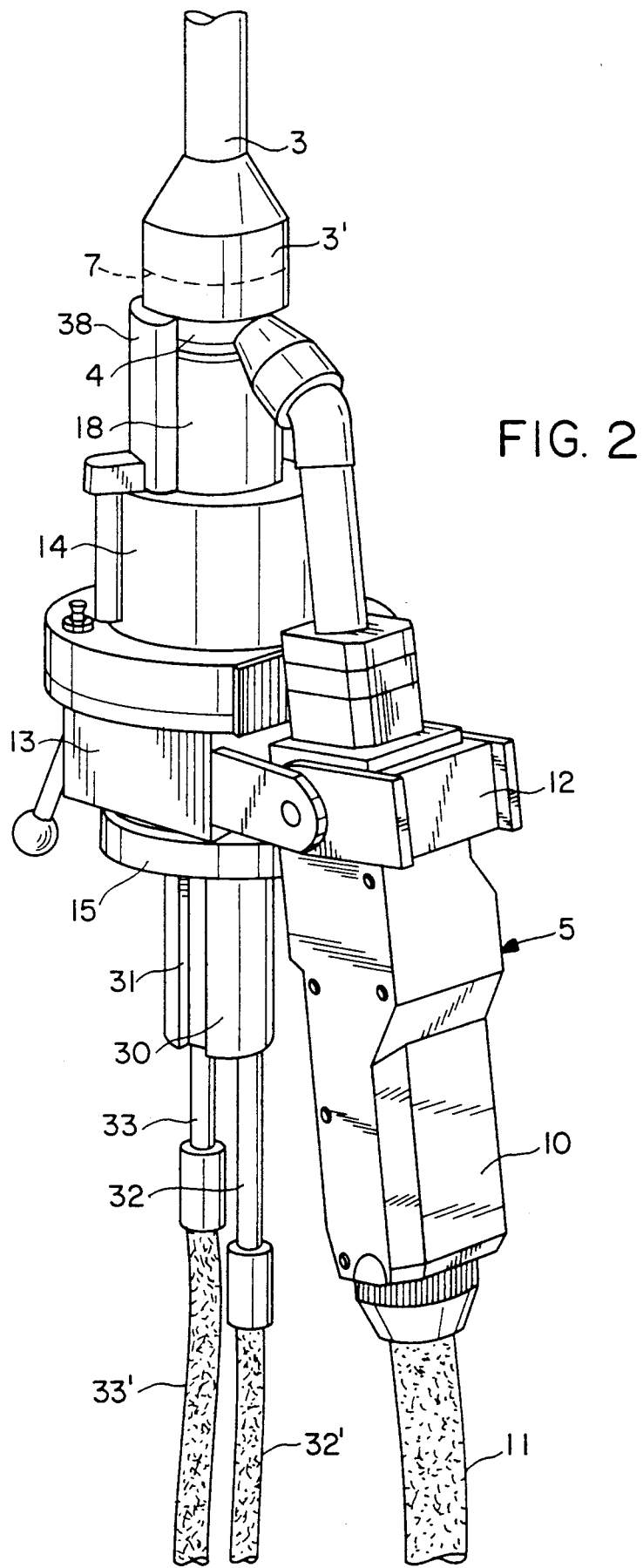
FIG. 2 is a perspective view of the detail II of FIG. 1 showing the welding torch and its support.

As can be seen in FIG. 2, the collars 3 comprise a lower part of large diameter 3' connected to the regular passage path of the collar by a frustoconical part.

The heating rod 4 introduced into the collar 3 comprises a lower part projecting in relation to the lower part 3' of the collar, below the connecting weld.

The demounting of the heating rod 4 is carried out by sectioning of the large-diameter part 3' of the collar 3, above the connecting weld of the heating rod 4.

FIG. 2 shows, in broken lines, a cut-off line 7 permitting the separation of a heating rod 4 from the corresponding sleeve.

After the collar is cut off, the rod 4 is extracted by axial sliding within the collar.

The cut-off end of the collar 3 is then cleaned, following which it is necessary to effect the fixing of a replacement heating rod.

In the case of the process according to the invention, the replacement heating rod is introduced directly into the cut-off collar and then fixed in a temporary manner by the TIG process, by welding points which are formed manually.

The position of the heating rod is then monitored, before effecting the final fixing thereof by an annular weld joint joining the heating rod to the end of the collar.

This orbital welding operation is carried out by using the device which will be described with reference to all the drawing figures.

FIG. 1 shows the entire welding device which comprises a welding torch 5 shown in service position at the lower part of a collar 3, a cabinet 6 to supply the welding torch, a control module 9 and an assembly 8 to supply the electric current for welding and the inert gas.

The control station 9 and the assembly 8 are constituted by of equipment conventionally used electrical welding under inert gas.

Figure 3:
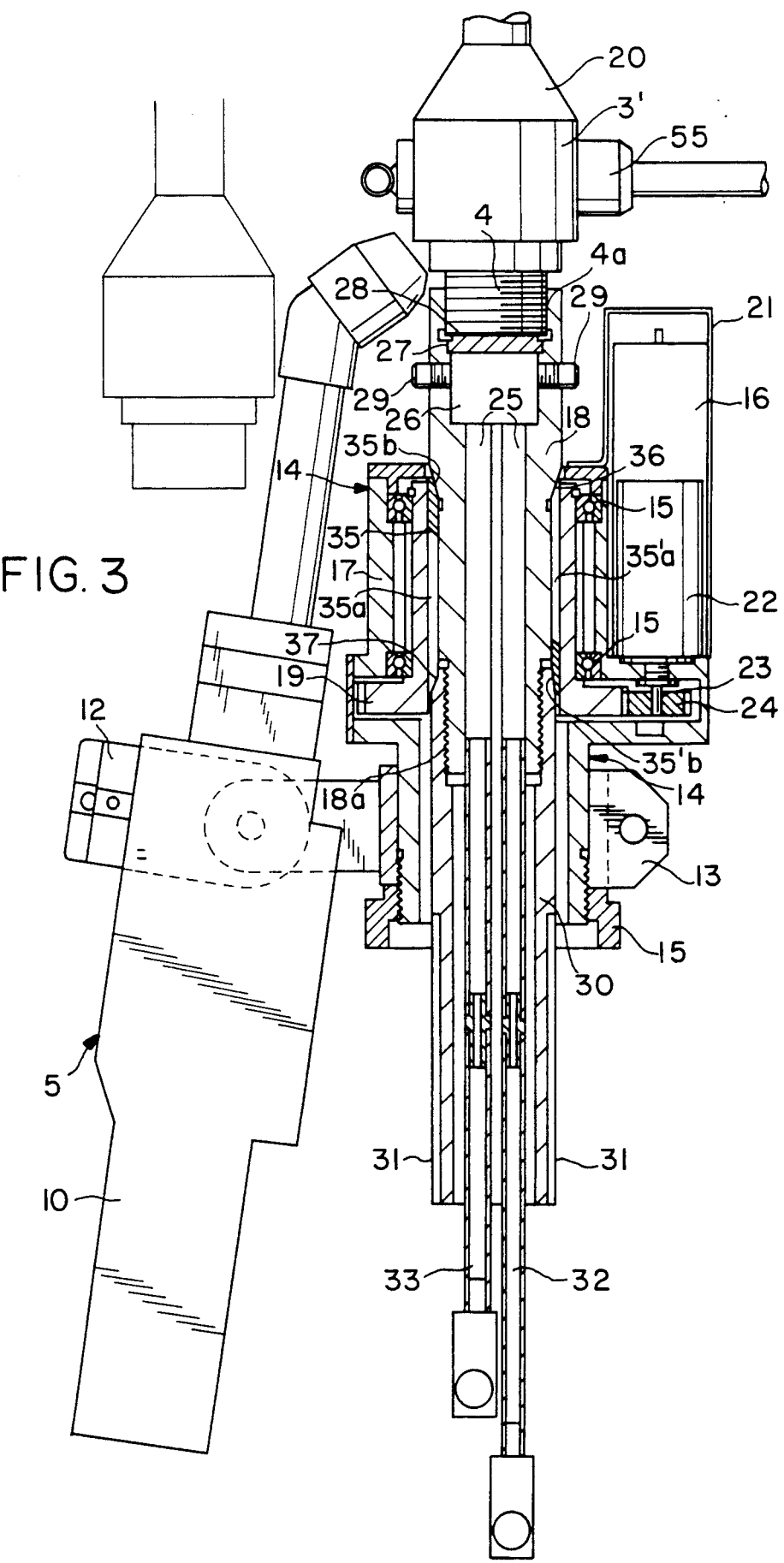
FIG. 3 is an elevation view, partly in section of the welding torch.

The welding torch 5, shown in FIGS. 2 and 3, comprises a MIG welding gun 10 connected by a multiple supply lead 11 to the cabinet 6. The body of the gun is connected in an articulated manner by means of a caliper 12 to a fixing flange 13, which may be clamped onto the support 14 of the welding head and maintained in position by a knurled nut 15.

In the course of the use of the welding torch, the parameters such as the electric voltage and current intensity are regulated by virtue of a computer in such a manner as to obtain the best possible operating point. This MIG welding regulation process is generally called "MIG SYNERGIE" welding by those skilled in the art.

The welding gun 10 can be placed and locked in an inclined position such as that represented in FIGS. 2 and 3, permitting the performance of the welding at the location of the zone of connection between the rod 4 and the end of the collar 3.

The support 14 of the welding torch comprises a lower part on which the attachment flange 13 of the welding gun is fixed and an upper part ensuring the rotary mounting and the orbital rotary drive of the welding gun.

This upper part comprises a tubular element 19, the lower part of which is machined to constitute a toothed wheel.

This tubular element 19 is itself fixed, in the manner which will be described further on, on a hollow shaft 18 connected to the end of the heating rod 4.

The moveable part of the support 14 of the welding gun is rotatably mounted about the axis of the hollow shaft 18, coinciding with the axis of the rod 4 of the collar 3, by means of two ball bearings 15. This moveable part comprises, in particular, a tubular piece 17 which is solid with the lower part of the support 14 carrying the welding torch and an electric motor 16 placed within a protective cap 21. The motor 16 is associated with a position encoder 22 and comprises an output shaft 23 on which there is keyed a pinion 24 engaging with the toothed wheel constituting the lower part of the tubular element 19.

The setting into rotation of the motor 16 causes the collar 3 and the rod 4 to describe a movement orbital in relation to the support 14 of the welding gun, about the axis 20.

In a known manner, the part of rod 4 projecting in relation to the end of the collar 3 comprises a threaded part 4a.

The end of hollow shaft 18 comprises a corresponding threaded part which can be engaged on the threaded part 4a rod when the latter is connected in a temporary manner by welding points to the collar 3.

The shaft 18 comprises two longitudinal channels 25 opening at the upper part of the shaft 18 into a cavity 26 separated from the threaded upper part of the shaft 18 by a throat 27 in which a closure plug 28 is placed at the time of the fixing of the shaft at the end of the rod 4.

The shaft 18 likewise comprises two radial pins 29 which are diametrically opposite and slightly projecting in relation to the outer surface of the shaft 18.

The shaft 18 comprises, at its lower part, a threading 18a on which the end of a nut 30 is engaged.

In order to mount the welding device on a replacement rod 4 of the pressurizer, after temporary welding by points by the TIG process, of this rod on the collar 3, the shaft 18 is engaged and screwed on the threaded part 4a of the rod projecting in relation to the collar 3.

A tool of tubular shape of great length comprising notches on its upper part which are engaged on the pins 29 permits locking of the shaft 18.

The closure plug 28 is intercalated and clamped between the shoulder limiting the throat 27 and the lower end of the rod 4.

The nut 30 is assembled to the lower part 18a of the shaft 18, before mounting thereof on the rod. The nut 30 comprises longitudinal passages 31 permitting the engagement of a tool ensuring the screwing or unscrewing of the nut 30 on the lower part of the shaft 18.

Tubes for the circulation of cooling water 32 and 33 are fixed within the nut 30 and engaged by their upper part, within the channels 25, at the time the nut 30 is mounted on the shaft 18.

As can be seen in FIG. 2, the tubes 32 and 33 are connected to flexible pipes 32' and 33' respectively assuring circulation of water within the hollow shaft 18, as far as the cavity 26 closed by the plug 28. The cooling of the lower end of the rod 4 and of the zone in which the welding of this rod 4 on the collar 3 is carried out is ensured by construction via the upper part of the shaft 18 and of the plug 28.

The mounting of the welding torch on the shaft 18 is ensured by means of a clip 35 constituted by a tubular piece comprising longitudinal slits 35a, 35'a over its entire thickness and over a substantial part of its length, in its upper part and in its lower part.

The tubular clip 35 has an internal diameter substantially equal to the external diameter of the regular part of the shaft 18 about which the tubular element 19 of the support 14 of the welding gun 10 is engaged.

The clip 35 further comprises, at its ends, frustoconical bearing surfaces 35b and 35'b intended to engage, respectively, a frustoconical part 36 of the shaft 18 and a frustoconical upper end 37 of the nut 30.

The tubular clip 35 is placed in position on the corresponding part of the shaft 18 before mounting thereof and before the engagement of the nut 30 on the threaded part 18a.

The shaft 18 equipped with the clamping clip 35 and with the nut 30 is then fixed to the end of the rod 4, as already explained.

The nut 30 is in its unscrewed position corresponding to the position of radial retraction of the clip 35.

The welding torch is mounted on the shaft 18 by engaging the support 14 on the assembly constituted by the nut 30 and the shaft 18, by the bottom, the pipes 32' and 33' not being connected to the tubes 32 and 33.

The tubular element 19 is placed in position about the clip 35, the radial expansion and the clamping of which are performed by screwing of the nut 30. The welding torch is then solid with the shaft 18 and with the rod 4.

The position of the MIG welding gun 10 is regulated by the articulated fixing of the caliper 12 on the flange 13. The final operating position of the gun 10 permitting the formation of the welded joint between the rod 4 and the lower end of the collar 3 is shown in FIGS. 2 and 3.

In the course of positioning the support 14 of the welding torch, its axial positioning is represented in such a manner as to place the welding torch in its working position by means of a wedge 38 placed in abutment against the upper part of the support 14, and against the lower end of the collar 3. When the welding torch has been fixed by tightening the nut 30, the regulating wedge 38 is removed, this having served for the positioning of the end of the welding gun 10, as a function of the position of the lower end of the collar 3.

The tubes 32 and 33 of the cooling surface of the rod and of the collar are connected to the ends of the flexible pipes 32' and 33' which are connected, within the supply cabinet 6, to nozzles of a water supply circuit.

The flexible line 11 connected to the welding gun 10 ensures the passage of the welding wire made of welding alloy constituting the electrode and of a pipe for supplying the gun 10 with inert gas.

The cabinet 6 is mounted on the fixed plate 41 of a carriage 40 by means of a motor 43 and of a reduction gear 44 with a deflection angle.

The plate 41 is mounted on transport wheels 42 and comprises three hydraulic jacks 45 permitting the stabilization and the setting in height of the plate 41, in order to take into account the difference in height of the lower ends of the various collars 3 of the pressurizer.

Figure 4:
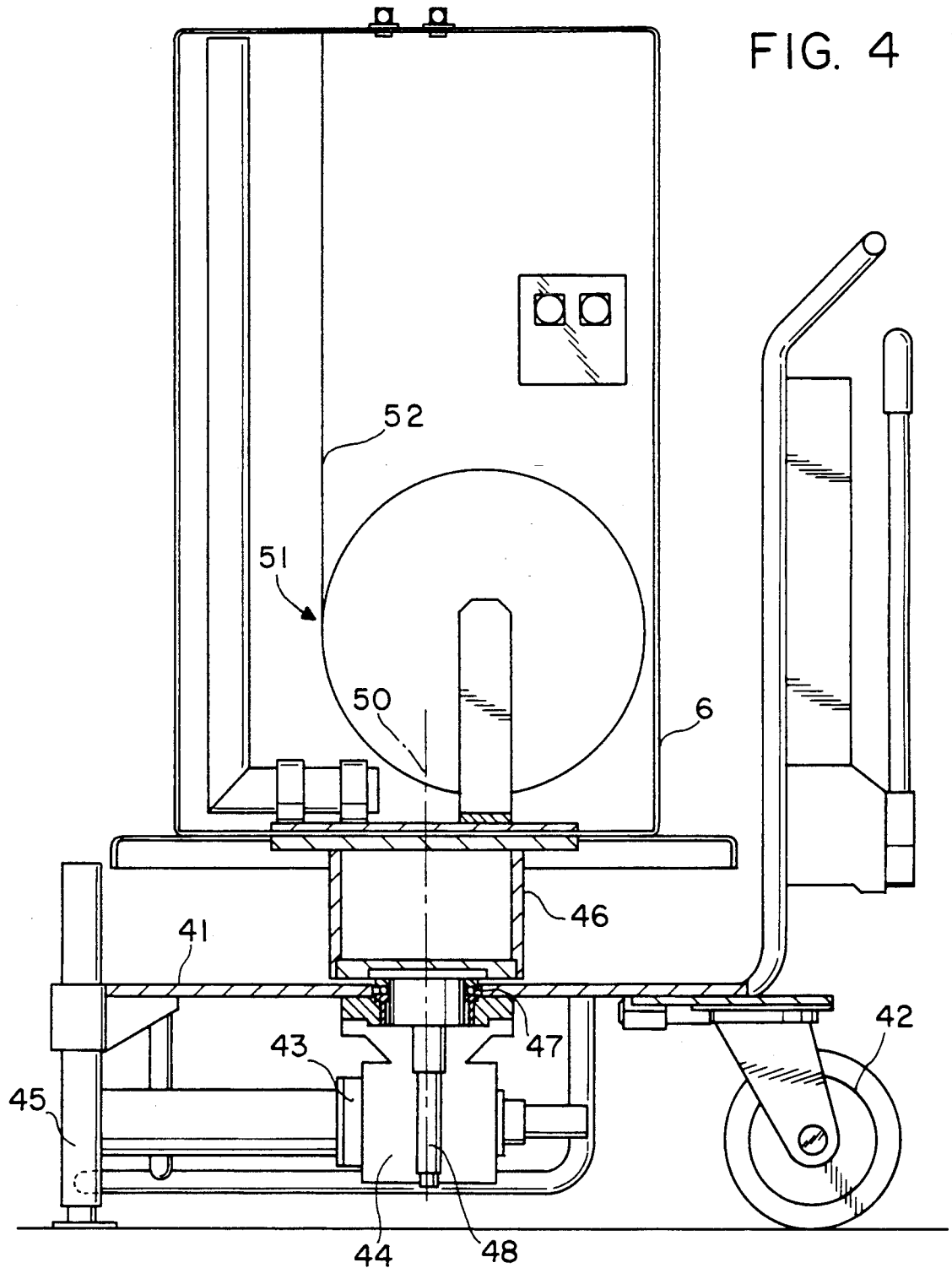
FIG. 4 is an elevation view partly in section of the wire unwinding device associated with the welding torch.

As can be seen in FIG. 4, the cabinet 6 rests, via a base 46, on a thrust ball bearing 47. The output shaft of the motor reduction gear 43, 44 is connected to the base 46 in such a manner as to set the cabinet 6 into rotation about a vertical axis 50.

In order to effect the orbital welding of a heating rod 4 to the end of a collar 3, the fixed plate 41 is so positioned that the axis of rotation 50 of the cabinet 6 is substantially in the extension of the axis 20 of the rod 4 and of the collar 3 on which the orbital welding is carried out.

The cabinet 6 then closes, in particular, a motor-driven device 51 for unwinding wire, comprising a reel on which the welding wire 52 is wound.

The speed of unwinding and of supply of the wire is regulated in such a manner as to ensure a regular and satisfactory supply, of welding alloy to the welding zone, during the orbital welding.

Moreover, the motor reduction gear assembly 43, 44 comprises an encoder 22, the indications of which assure during the welding, perfectly synchronous rotation of the cabinet 6 and of the welding torch 5, of which the rotation ensured by the motor 16 is monitored by the encoder 22.

This ensures a displacement, in simultaneous rotation, of the welding head and of its means of supply with welding wire and with inert gas.

The water supply tubes 32 and 33 are mounted so as to be free to rotate within the nut 30 and within the shaft 18.

The fixed plate 41 of the cabinet 6 carries a control unit 54, the panel of which is accessible on one of its faces, to ensure the displacement, the positioning and the various functions of the supply cabinet 6.

In order to ensure the replacement of a defective heating rod, after sectioning of the corresponding collar above the weld forming the connection to the rod, this rod is extracted and a replacement rod is introduced, after cleaning of the cut-off end of the collar.

The positioning of the heating rod is monitored, and the temporary placing in position of the rod is ensured by a few TIG welding points in the junction zone between the rod and the end of the collar.

The position of the rod is monitored again, and then there is screwed to the end of this rod an assembly constituted by a hollow shaft 18 on which a nut 30 is engaged, with intercalation of a closure plug 28 between the end of the shaft 18 and the lower end of the replacement rod.

The support 14 of a MIG welding gun 10 is engaged on the shaft 18 by regulating its axial position by means of a wedge 38. The fixing of the support 14 and of the gun 10 on the shaft 18 is then carried out by screwing the nut 30. The regulating wedge 38 is removed, and the supply cabinet 6 carried by the support 41 is placed vertical to the collar 3 on which the welding is to be performed. The position of the cabinet 6 is adjusted, both in the horizontal plane and in the vertical direction, before fixing it in position by means of the hydraulic jacks 45.

The necessary connections are made between the welding gun and the supply cabinet, and then the initiation of the welding operation is commanded by means of the control panels 7 and 54.

The welding is performed automatically, the welding torch and the cabinet 6 turning in a synchronous manner about the axis of the rod. The welding is carried out in a single pass, with a slight overlap, the welding torch carrying out a rotation slightly greater than 360° about the axis common to the rod and to the collar.

The entire welding cycle is performed without any intermediate monitoring, the stopping of the welding torch and the cut-off of the welding current being controlled automatically and followed by reversal of the direction of rotation of the drive motors of the welding torch and of the supply cabinet, to return these elements into their initial position.

During the welding, collar 3 and the rod 4 are connected to earth by means of a contact band 55 on which a conductor is welded.

The weld bead is deposited within a toric space of triangular cross-section situated below the end of the collar which has been cut off for demounting of the defective rod.

As compared with TIG welding, which requires regulation, with precision, of the position and the orientation of the plane defined by the tungsten electrode and fusible wire, the MIG welding has the advantage of avoiding such a regulation of delicate performance which must, moreover, be modified at each pass.

The process according to the invention permits the performance of the replacement of a heating rod of a pressurizer of a pressurized-water nuclear reactor in a simple, reliable and rapid manner and without using any complex and bulky tooling. The reduction of the intervention time for the replacement of a heating rod is very beneficial, since this operation must be performed in a highly irradiated zone.

Thus, it is possible to use any type of MIG welding gun, to mount the gun in a manner different from that which has been described, to cool the welding zone by means different from those which have been described.

In certain cases, the end of the heating rod does not comprise any threading; it is then necessary to provide means for fixing the support of the welding torch which are adapted to the shape of the end of the heating rod. These means may be constituted, for example, by clips or mandrels or any other mechanical clamping means.

The invention is applicable to the replacement of the defective heating rods of a pressurizer of a pressurized-water nuclear reactor.

We claim:

1. Process for replacement of a heating rod (4) of a pressurizer of a pressurized-water nuclear reactor, which heating rod is introduced and fixed by welding in a collar (3) which is solid with a casing of said pressurizer at a passage opening of said casing, said process comprising the steps of
    (a) sectioning said collar (3) above a connecting weld of said heating rod (4);
    (b) extracting said heating rod;
    (c) positioning a replacement heating rod (4);
    (d) fixing said replacement heating rod in a temporary manner on said collar; and
    (e) forming a continuous annular junction weld between said heating rod (4) and said collar (3) by
        (i) fixing a tubular shaft (18) on one end of said heating rod projecting in relation to said collar (3);
        (ii) in an extension of said heating rod, engaging and fixing on said shaft (18), in welding position, a welding device comprising a tubular support (14) and an inert-gas orbital welding torch with an electrode made of fusible metal which is rotatably mounted about an axis of said tubular support (14) coinciding with an axis (20) of said heating rod (4), equipped with a rotary drive means (16) and associated with a device for unwinding welding wire (51) rotatably mounted on a fixed base (41) about said axis (20) of said heating rod (4) and equipped with a rotary drive means, said welding torch (5) and said unwinding device (51) being set into rotation in a synchronous manner about said axis (20) of said heating rod (4), in such a manner as to effect welding in a single pass over an entire periphery of said heating rod (4) and of said collar (3).

2. Process according to claim 1, wherein, in order to effect the welding of said rod (4) on said collar (3), said welding torch (5) and said unwinding device (6) are caused to effect a rotating greater than 360°, to ensure a predetermined overlap of said weld bead.

3. Process according to claim 2, wherein, after continuous welding of the rod (4) and of the collar (3), the welding torch (5) and the unwinding device (51) are caused to effect a rotation in reverse direction, in order to return them to their initial position.

4. Process according to claim 1, wherein the positioning, the temporary fixing and the continuous welding of the replacement rod (4) are effected directly after sectioning of the collar (3), without any intermediate machining operation.

* * * * *